(12) United States Patent
Failla et al.

(10) Patent No.: US 8,386,362 B2
(45) Date of Patent: Feb. 26, 2013

(54) INFORMATION DISTRIBUTION PROCESS AND METHOD

(75) Inventors: Santino Failla, Southington, CT (US); Georgia Bilis, Watertown, CT (US); George David Easterbrook, Jr., Bantam, CT (US); Timothy Vincent, Shelton, CT (US)

(73) Assignee: The NASDAQ OMX Group, Inc., New York, NY (US)

( * ) Notice: Subject to any disclaimer, the term of this patent is extended or adjusted under 35 U.S.C. 154(b) by 1859 days.

(21) Appl. No.: 10/206,810

(22) Filed: Jul. 25, 2002

(65) Prior Publication Data

US 2003/0225646 A1 Dec. 4, 2003

Related U.S. Application Data

(60) Provisional application No. 60/385,988, filed on Jun. 5, 2002, provisional application No. 60/385,979, filed on Jun. 5, 2002.

(51) Int. Cl.
*G06Q 40/00* (2012.01)

(52) U.S. Cl. .......................................... 705/37; 705/35

(58) Field of Classification Search ............... 705/37, 705/35; 70/35, 37
See application file for complete search history.

(56) References Cited

U.S. PATENT DOCUMENTS

| | | | |
|---|---|---|---|
| 5,077,665 A * | 12/1991 | Silverman et al. .............. 705/37 |
| 5,101,353 A | 3/1992 | Lupien et al. | |
| 5,546,575 A * | 8/1996 | Potter et al. .................... 707/101 |
| 5,812,988 A | 9/1998 | Sandretto | |
| 6,012,046 A | 1/2000 | Lupien et al. | |
| 6,035,287 A | 3/2000 | Stallaert et al. | |
| 6,157,914 A | 12/2000 | Seto et al. | |
| 6,278,982 B1 * | 8/2001 | Korhammer et al. ....... 705/36 R |
| 6,317,728 B1 | 11/2001 | Kane | |
| 6,408,282 B1 * | 6/2002 | Buist ........................... 705/36 R |
| 6,442,533 B1 | 8/2002 | Hinkle | |
| 6,618,707 B1 * | 9/2003 | Gary ........................... 705/36 R |
| 7,136,834 B1 * | 11/2006 | Merrin et al. ................... 705/37 |
| 7,167,844 B1 | 1/2007 | Leong et al. | |
| 7,171,386 B1 * | 1/2007 | Raykhman ..................... 705/37 |
| 7,376,614 B1 * | 5/2008 | Scheinberg et al. ............ 705/37 |
| 7,379,909 B1 * | 5/2008 | Cruz et al. ...................... 705/35 |
| 7,406,443 B1 * | 7/2008 | Fink et al. ....................... 705/37 |
| 8,055,576 B2 * | 11/2011 | Merrin et al. ................... 705/37 |
| 2001/0034686 A1 | 10/2001 | Eder | |
| 2001/0042041 A1 * | 11/2001 | Moshal et al. .................. 705/37 |
| 2002/0004774 A1 * | 1/2002 | Defarlo .......................... 705/36 |
| 2002/0052827 A1 | 5/2002 | Waelbroeck et al. | |
| 2002/0059129 A1 * | 5/2002 | Kemp et al. .................... 705/37 |
| 2002/0091617 A1 * | 7/2002 | Keith .............................. 705/37 |
| 2002/0099641 A1 * | 7/2002 | Mills et al. ..................... 705/37 |
| 2002/0156716 A1 | 10/2002 | Adatia | |
| 2002/0178102 A1 * | 11/2002 | Scheinberg et al. ............ 705/37 |
| 2002/0194115 A1 * | 12/2002 | Nordlicht et al. .............. 705/37 |
| 2003/0009411 A1 * | 1/2003 | Ram et al. ...................... 705/37 |
| 2003/0050888 A1 * | 3/2003 | Satow et al. .................... 705/37 |
| 2003/0083973 A1 | 5/2003 | Horsfall | |
| 2003/0110118 A1 * | 6/2003 | Tilfors ............................ 705/37 |
| 2003/0177086 A1 * | 9/2003 | Gomber et al. ................ 705/37 |
| 2003/0225671 A1 | 12/2003 | Miller et al. | |
| 2003/0225673 A1 | 12/2003 | Hughes, Jr. et al. | |
| 2003/0229566 A1 | 12/2003 | Moore et al. | |
| 2003/0229568 A1 | 12/2003 | Richmann et al. | |

* cited by examiner

*Primary Examiner* — Kenneth Bartley
(74) *Attorney, Agent, or Firm* — Nixon & Vanderhye P.C.

(57) ABSTRACT

A process for distributing information in an electronic market includes an insertion process to insert, in a file that resides in a storage medium, information representing an activity relating to a security interest stored in an order book that resides in main memory and is accessible by a matching process.

27 Claims, 6 Drawing Sheets

INFORMATION DISTRIBUTION PROCESS AND METHOD

RELATED APPLICATIONS

This application claims the priority of U.S. Provisional Patent Application No. 60/385,988, entitled "Security Processor", and filed on Jun. 5, 2002 and to U.S. Provisional Patent Application No. 60/385,979, entitled "Supermontage Architecture", and filed on Jun. 5, 2002.

BACKGROUND

This invention relates to electronic securities trading, and the processing and displaying of information relating to electronic securities trading.

Electronic equity markets, such as The Nasdaq Stock Market™ collect, aggregate, and display pre-trade information to market makers. In The Nasdaq Stock Market™, for example, this pre-trade information can take the form of a quote that represents a single or an aggregate of same-priced principal or agency orders. A market, such as The Nasdaq Stock Market™ also provides trading platforms through which market participants may trade securities in the marketplace.

SUMMARY

According to an aspect of this invention, a process for distributing information in an electronic market includes an insertion process to insert, in a file that resides in a storage medium, information representing an activity relating to a security interest stored in an order book that resides in main memory and is accessible only by a matching process.

According to a further aspect of the invention, a method for distributing information in an electronic market includes inserting, in a file that resides in a storage medium, information representing an activity relating to a security interest stored in an order book that resides in main memory and is accessible only by a matching process.

According to a further aspect of the invention, a computer program product residing on a computer readable medium for distributing information in an electronic market includes instructions for causing a computer to insert, in a file that resides in a storage medium, information representing an activity relating to a security interest stored in an order book that resides in main memory and is accessible only by a matching process.

According to a further aspect of the invention, a method for distributing information in an electronic market includes inserting into a persistent store information representing an activity relating to a security interest stored in an order book in a main memory of a securities processor and directing queries for status of the order book information to a process that controls the persistent store.

One or more of the following features may also be included.

A user query relating to the security interest stored in the file that resides in the storage medium may be received. The file may contain information representing activities relating to security interests stored in at least two order books that reside in main memory. A securities processor may include the order book. The storage medium may be a sequential access storage device. The file may be partitioned. The activity relating to the security interest may include an order. The file may be searched. The information may be retrieved from the file. The received user query may be responded to. A user query relating to the information stored in the persistent store may be received. The main memory may be random access memory. The main memory may be a cache.

One or more advantages can be provided from the above. By inserting security information from one or more securities processors into a server's storage, the information may be quickly accessed from the common storage location. Further, by transferring the information with a dedicated central processing unit (CPU), trade processing by a separate CPU is not interrupted to concurrently transfer of the information. Additionally, the dedicated CPU can receive and process queries from users without taxing the trade processing CPU. By balancing the concurrent trade processing and responding to user queries, a user is also better able to conduct securities trading.

DETAILED DESCRIPTION

Figure 1:
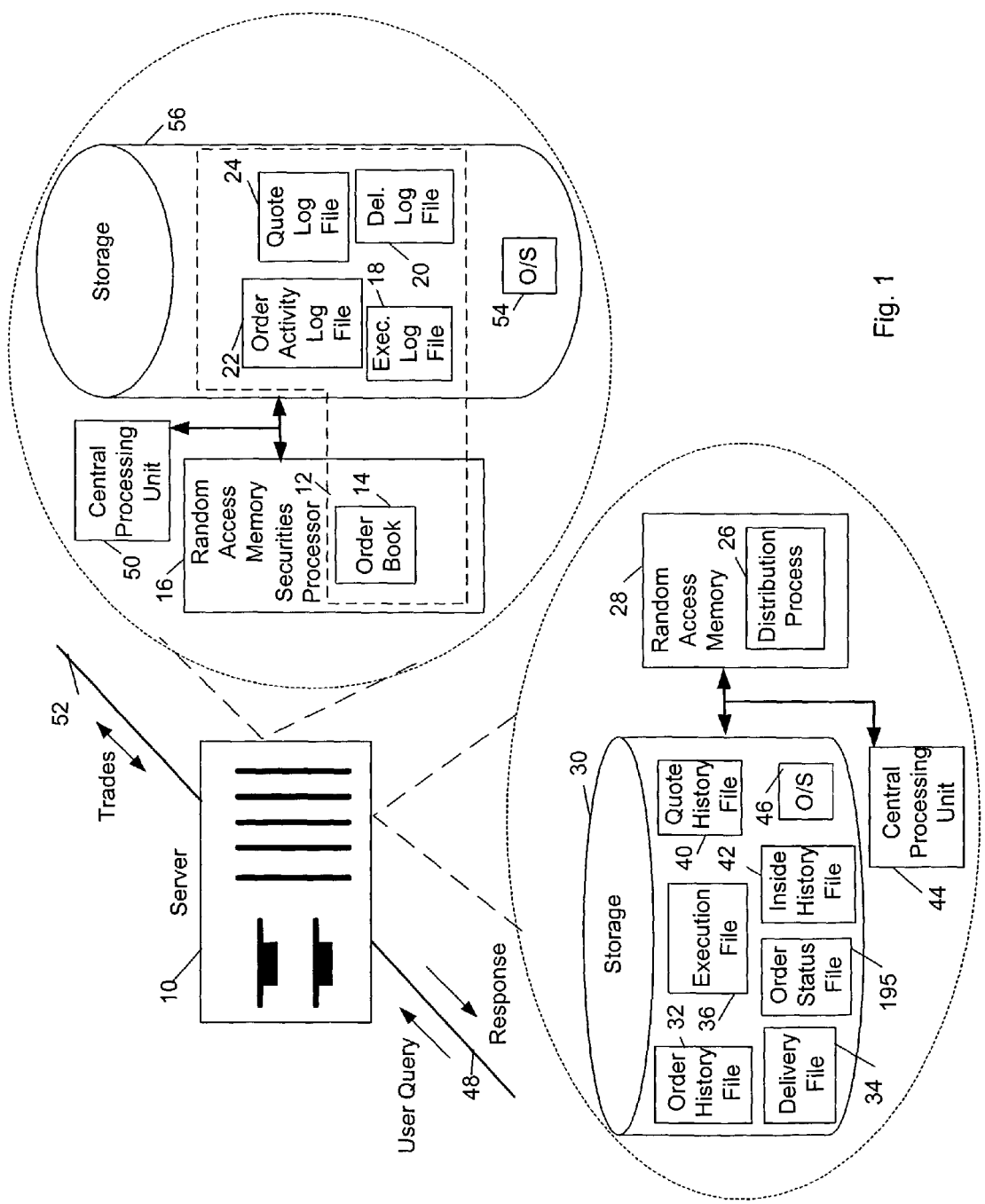
FIG. 1 is a block diagram of a server.

Referring to FIG. 1, a server 10 is shown that includes a securities processor 12 that contains an order book 14, which resides in random access memory 16 that stores securities trade information and an execution log file 18, a delivery log file 20, an order activity log file 22, and a quote log file 24 that stores data related to processing incoming orders against the information in the order book. The server 10 also includes a distribution process 26 resident in a portion of another random access memory 28 that retrieves and distributes the data in the log files 18, 20, 22, 24 into another storage 30 in the server 10. The distribution process 26 stores the data from the securities processor 12 along with data retrieved from other securities processors (not shown) in an order history file 32, a delivery file 34, an execution file 35, an order status file 38, a quote history file 40, and an inside history file 42.

The securities processor 12 is one portion of a computerized trading system, which trades securities electronically by processing one-sided or two-sided transactions entered by a user (e.g., a market participant). Users typically access and use the computerized trading system via a computer, thus allowing the users to enter security trades themselves or through professional traders/brokers. For efficient securities trading, one central processing unit (CPU) 44 executes instructions from the distribution process 26 and an operating system (O/S) 46, for example, to receive and respond to user queries (e.g., market participants) over a bus 48, while another CPU 50, which is not interrupted by the user queries, concurrently processes trades received over network 52 by executing instructions stored in an O/S 54, along with other instructions stored in the server storage 56.

The server storages 30, 56 store respective operating systems 46, 54 along with respective log files 18, 20, 22, 24 and files 32, 34, 36, 38, 40, 42. In some implementations, the server storages 30, 56 may individually or in combination be a hard disk drive, a tape drive, an optical drive, a redundant array of independent disks (RAID), a random access memory (RAM), or a read-only memory (ROM), for example, or other similar sequential access storage device or devices that provides a persistent store of the recorded information. Typically, server 10 is a multi-processing, fault-tolerant system that includes multiple central processing units that each have a dedicated main memory system, in this implementation random access memory 16, or share a common main memory pool. While being executed by the central processing unit(s) of server 10, multiple instantiations of securities processor 12 may reside in the main memory system of server 10. Further, the processes and subroutines of securities processor 12 may also be present in various levels of cache memory incorporated into server 10. Also while the log files 18, 20, 22, 24 and the files 32, 34, 36, 38, 40, 42 are stored on separate server storages 30, 56, in some implementations the log files and files may be stored on the same server storage or other similar sequential access storage device or devices that provides a persistent store of the log files and files. Also while one server 10 includes the server storages 30, 56 and the random access memories 16, 28, in some implementations two or more servers may share server storages 30, 56.

Figure 2:
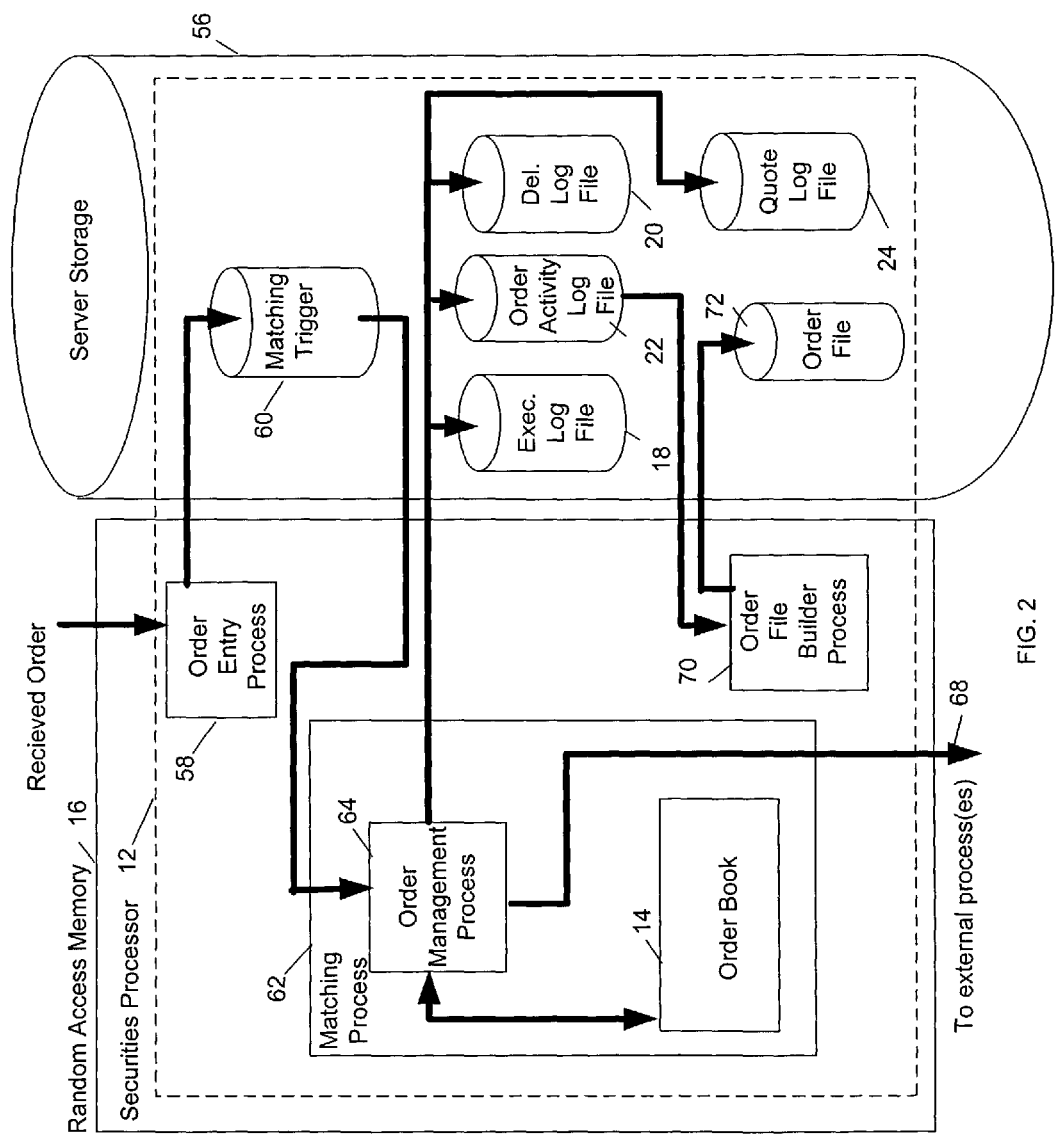
FIG. 2 is a block diagram of a random access memory and a server storage.

Referring to FIG. 2, the securities processor 12 that accesses portions of the server storage 56 and resides in the random access memory 16 is shown. For example, to perform a trade for a particular security, a user enters an order into the computerized trading system that is received and directed to the securities processor 12 assigned to the particular security. In some implementations, the securities processor 12 may be assigned to two or more securities in order to distribute the volume of securities trading over a number of securities processors. In some other implementations, the securities processor 12 may be assigned to one heavily traded, high volume security to reduce trading volume of that security on other securities processors (not shown).

The securities processor 12 may be assigned to one particular security and store related security trading interest in the order book 14 residing in the random access memory 16 of that securities processor 12. By random access memory is meant main memory or alternatively one or more levels of cache memory. In some implementations a matching process may load portions of the order book into a level of cache memory from the main memory. Alternatively, the securities processor 12 may be assigned to multiple securities and correspondingly, the order book 14 residing in random access memory 16 of that securities processor stores the trading interests of those multiple securities. In some implementations, to store interests for multiple securities, the order book 14 in random access memory 16 may be partitioned into multiple sections, dimensions, or files to store the interests assigned to the securities processor 12. Here the order book 14 resides within the execution space of the random access memory 16 that has the matching process 62. However, in some implementations the order book 14 resides in an execution space of the random access memory 16 that is separate from another execution space having the matching process 62. Also, the order book 14 is exclusively accessible by the matching process 62 regardless whether or not both reside in the same execution space of the random access memory 16.

In addition to the support for a horizontally scalable architecture, the in memory order book 14 provides for reliable transaction processing at extremely high rates for an individual security. The internal state of the securities processor 12 is adjusted by processing incoming transactions in strict first-in, first-out serial sequence. The transaction rates capable for this approach exceeds those rates provided by traditional file based approaches and provide a reliable approach to use the order book 14 in random access memory 16 to hold the state of the book. By inserting, updating and retrieving elements (records) from the in-memory order book 14 instead of a disk file, throughput substantially increases. Also, logic for allocating and freeing memory, maintaining lists and index tables associated with the in-memory order book 14 may be encapsulated random access memory 16.

In general, an order directed to the securities processor 12 is received by an order entry process 58 that performs cursory checking functions (e.g., order eligibility, order syntax, etc.) on the received order. If the received order fails one or more of the cursory functions the order is returned to the user, however, if the cursory functions are passed, the received order is logged to a matching trigger 60 stored in the server storage 56. The matching trigger 60 queues the received order along with, for example, other orders, quotes, deliveries, or supervisory commands that are received by the securities processor 12 for the security or securities assigned to the securities processor. Typically the received order represents a new order for processing (e.g., match against open orders, add as new open orders, etc.) while the supervisory commands, for example may cancel, modify, or execute other similar actions against existing orders stored in the order book 14 residing in random access memory 16.

Once queued into the matching trigger 60, the received order is held in the matching trigger until pulled into a matching process 62 by an order management process 64. The matching process 62 matches portions of the received order, i.e., executes and allocates the received orders and stores the unmatched portion of the order in the order book 14. After pulling the received order, which is at least partially marketable and has cleared initial validations, the matching process 62 attempts to execute all or part of the received order with one or more orders on the contra side of the order book 14. Upon pulling the received order, the matching process 62 checks and validates the received order (e.g., marketability check, apply short sale rule, etc.) with definite and unambiguous knowledge of the current state of the market for the particular security. Some of the validations are specific to orders received while some validations are specific for quotes received by the securities processor 12 or the validations may be common to quotes and orders. In this particular example, after the securities processor 12 receives an order, if the check or validation fails the received order is returned to the user (e.g. market participant) unexecuted.

One factor that is considered by the matching process 62 is the quantity of the received order. Matching of the received order continues until the entire received, marketable order is exhausted. In executing the received order to the fullest extent, a display size of the received order, as well as a reserve size, if any, are combined and the matching process 62 continues to execute this combined quantity of the received order against contra side orders stored in the order book 14 until exhaustion of the received order. To match against orders stored in the order book 14, the stored orders have an open status and are on the opposite side of the market to that of the received order. Once the received order is completely exhausted, the matching process 62 is complete and the execution is reported to other processes internal and external to the securities processor 12.

Another factor concerning the matching process 62 is the marketability of the received order. After passing the previous validations during the order entry process 58, the matching process 62 determines whether the received order is marketable. The received order is marketable if the order is a limit or other type of priced order and the received order's price locks or crosses the inside for the particular security. For a received order which is a bid, the inside is locked or crossed if the bid price is higher than the current best (i.e., lowest) ask price; alternatively, for a received order which is an ask order, the inside is locked or crossed if the ask order price is lower than the current best (i.e., highest) bid price. The received order can also be marketable if it is a market type order.

Subsequently, if the order is marketable, further validations are performed using current inside market prior to retrieving an order stored in the order book 14 to match against. However, if after the received order is determined marketable and subsequently matched against a security interest retrieved from the order book 14, the inside spread changes which may result in the price of the received order not locking or crossing the market that occurrence could end the matching process 62. Also, if the received order, or a portion of the received order, is not marketable or not fully executable, the remainder is added to the order book 14 for matching to a future order received by the securities processor 12.

After the received order is determined marketable and subsequent validations based on current inside market are passed, the order management process 64 searches contra orders stored in the order book 14 that correspond to the particular security of the received order. To search the orders stored in the order book 14, the order management process 64 may use parameters associated with the received order. In some implementations, one parameter associated with the received order is a market participant ID that may be passed to the order management process 64 as a search parameter. By searching with the market participant ID, internalization, preferenced orders, or regular matching may be performed by the order management process 64. A matching preference may also be associated with the received order. For example, the received order may specify a matching condition that causes the matching algorithm to match based on a price/time priority, a price/fee/time priority, a price/size priority, or other preference. Also, the order management process 64 checks that a retrieved order from the order book 14 is available for matching (e.g., it is not in outage, etc.).

To initiate matching the received order, the matching process 62 determines the total quantities that can be executed in the current matching cycle. The quantities are, for example, the total executable display quantity for market participant's non-unlisted trading privileges (non-UTPs), the total executable reserve quantity for non-UTPs, and the total executable UTP quantity. The UTP quantity is segregated in some embodiments because the UTPs are allocated against only after all the display quantities and reserve quantities for non-UTPs at a particular price level are exhausted. These quantities are used to determine how much quantity from the display and reserve size of a retrieved order can used in a match and whether a retrieved UTP order can be filled. Once the total executable quantities are defined, the orders for allocation are retrieved from the order book 14 in accordance with the appropriate prioritization algorithm and the use of internalization.

The order management process 64 retrieves an order from the order book 14 and determines if the retrieved order meets the execution preference and requirements of the current match. For example, if a received order is specified with a prioritization preference of price/fee/time priority, and the order management process 64 retrieves an order from the order book 14 with fees, then this retrieved order is skipped. The order management process 64 continues to search the order book 14 for orders at a price level until an order that does not have access fees is found. If the order of this type is not found, the order management process 64 starts over and retrieves orders from the order book 14 that charge fees. After all orders residing in the order book 14, at a price level that meet the specified requirements for the match are exhausted, the matching cycle continues at the next price level provided the market is still crossed.

To execute a match between the received order and the order retrieved from the order book 14, the order management process 64 determines if the match, for example, is an automatic execution, an odd lot, or a delivery and assigns the appropriate execution type to the execution. After matching the received order, the order management process 64 updates the retrieved order in the order book 14. For example, the retrieved order may be completely exhausted and updated as 'executed' or, in another example, the retrieved order may have been partially executed and the remainder of the order is stored in the order book 14 with an open status. Also, during the matching of the received order, as the displayed size is exhausted, orders can be replenished from the reserve size. As portions of the received orders are matched by orders on the order book 14, the order management process 64 updates the order book 14 to reflect the matches. The order management process 64 also checks if the received order should be refreshed. If the order is refreshed and the market is still crossed, the order management process 64 continues matching. Otherwise, the order management process 64 completes by reporting the portion executed to the execution log file 18, stored in the server storage 56, and other processes included in the securities processor 12 and external 68 to the securities processor.

In some implementations matching process 62 includes a looping function that is triggered when the received order is identified as being executable. The matching process 62 attempts to match a portion of the received order and continues matching the received order as long as the received quantity is greater than zero and the market is still crossed. If either of these conditions fail, then the matching process 62 is completed and executions are reported to the execution log file 18 and the other processes internal and external 68 to the securities processor 12.

During operations of the securities processor 12, the order book 14 is exclusively accessible by the matching process 100, which serves as an interface and the single point of access to the order book. By restricting access of the order book 14 to the matching process 62, other processes included in or related to the securities processor 12 do not interfere with operations of the order book 14. For example, in some computerized trading systems an order book may, for example, be scanned to provide securities information to users during the same time period in which orders are retrieved from the order book for matching to a received order. Interruptions, such as this, for allowing access and sharing of the order book between the matching process and other lower priority processes slows the matching process and reduces trading efficiency. Also, by restricting access to the order book 14, security information throughput significantly increases. Thus, by isolating the order book 14 to interact exclusively with the matching process 62, matching speed and efficiency increases.

Besides receiving and processing an order, other activities related to the security or securities assigned to the securities processor 12 may be received. For example, a quote update may be received by the securities processor 12 and pulled from the matching trigger 60 by the matching process 62 for adding the quote in the order book 14 or preparing the quote for matching. If the received quote does not lock or cross the market, the order book 14 is updated by replacing an existing quote or adding the received quote as an initial quote. In another example, a two-sided quote may be received by the security processor 12 and pulled from the matching trigger 60 by the matching process 62. The side of the quote that does not lock or cross the market may update an existing quote or may add the quote as an initially received quote in the order book 14. The quote side that locks or crosses the inside is matched by the matching process 62 and any remainder will be added to the order book 14. Also, the marketable side of a received quote is removed from the order book 14 and replaced by any remainder after matching. A received quote may also include a relative update (e.g., a size increment or a size decrement) in which the matching process 62 adjusts the existing quote in the order book 14 for the relative size changes.

Supervisory commands (e.g., closing positions for a specific market participant, blocking a market participant's positions from being opened during the market opening process, purging a market participant's orders, or other similar commands) may also be received by the securities processor 12 and pulled from the matching trigger 60 by the matching process 62 for execution. However, supervisory command activities are complete, inclusive, and are implemented as modular plug-in components.

After matching, for example, the received order, or a portion of a received order, against one or more orders in the order book 14 and prior to pulling the next activity order from the matching trigger 60, the order management process 64 reports the matching of the received order, or a portion of the received order, to the order activity log file 22 located in the server storage 56. Since the order activity log file 22 receives the report from the order management process 64 prior to pulling the next order from the matching trigger 60, the order activity log file has the current status of the order book 14, and thus the current status of the market before any further processing. Thus, if an unforeseen catastrophe occurs, such as losing the information contained in the order book 14, the order book may be rebuilt based on the information backed-up in order activity log file 22.

Besides reporting the execution of the received order or a portion of the received order, the order management process 64 may report, for example, executing a delivery order, executing an odd-lot order, adding a quote, canceling an order, canceling/replacing an order, purging an order, updating the order book 14 to reflect executions or adding an unmatched received order or a portion of the received order, or other similar activity associated to the securities processor 12. Also, in some implementations the order activity log file 22 may, for example, be a data file, a database, or other data storage structure residing in server storage 56. Once stored in the order activity log file 120, the activities may be disseminated, for example, to trade participants, an Automated Confirmation Transaction (ACT) system, other interested parties, or processes internal or external to the securities processor 12.

In particular, one process associated with the securities processor 12, which accesses the activities stored in the order activity log file 22 is an order file builder process 70. The order file builder process 70 constructs an order file 72 that provides near real-time disaster recovery of the order book 14 for a number of potential failure scenarios, as well as the contingent redeployment of activity processing to secondary securities processors (not shown). Each potential failure point in the trading system is supported by a level of redundancy, ranging from immediate system-level backup to delayed manual takeover. In the interest of rapid recovery for virtually all failures, a degree of automatic processing is allowed, but in general manual intervention is always an option. At lower failure levels, for example the failure of the securities processor 12, the securities processor is attempted to be restarted. As failure severity increases, such as the loss of the CPU 50 (shown in FIG. 1), the level of automation employed decreases. Ultimately, the most serious catastrophic failure, such as a loss of the entire server 10, may permit little automatic recovery.

To provide disaster recovery, the order file builder process 70 builds and maintains the order file 72 by retrieving the activities stored in the order activity log file 22. In some implementations, the order file 72 is stored on the server storage 56 and has the latest updates for open orders or orders with a special status (e.g., the market participant requests closing their positions due to equipment trouble, a display and reserve quantity are zero but the delivery quantity is greater that zero, etc.). While the order file builder process 70 stores activities related to updating the order book 14, activities not needed for reconstructing the order book 14, such as executed or canceling orders, are filtered from the material stored in the order file 72. By storing these activities, the order file 72 provides the current status of the security interests residing in the order book 14 to provide fast recovery in the event of a malfunction of the securities processor 12 or reassigning one or more securities to another security processor.

As mentioned, since the order book 14 resides in random access memory 16, such as main memory and in some implementations is accessed only by the matching process. In main memory information may be quickly stored on the order book as compared, for example, to order books residing in a magnetic medium (e.g., diskette, hard disk, etc.) which typically have much longer access times for storing and retrieving orders. Due to the fast accessibility of the random access memory 16, the order book 14 may also be quickly rebuilt by retrieving information stored in the order file 72, as compared to rebuilding order books stored on a slower access hard disk or other magnetic medium.

Besides storing executions and activities related to a received order in the execution log file 18 and the order activity log file 22, information associated to deliveries are stored in the delivery log file 20 and information associated with quotes received by the securities processor 12 are stored in the quote log file 24. Each of these log files 18, 20, 22, 24, which reside in the server storage 56, may be accessed by the distribution process 26 (shown in FIG. 1) to disperse the information stored in the log files respectively into the order history file 32, the delivery file 34, the execution file 36, the order status file 38, the quote history file 40, and the inside history file 42. These files 32, 34, 36, 38, 40, 42 store data from the securities processor 12 and other securities processors (not shown) which may reside in server 10 (shown in FIG. 1) so that the data may be accessed by users (e.g., market participants, maker makers, etc.) without interrupting trading processing by the securities processors.

Figure 3:
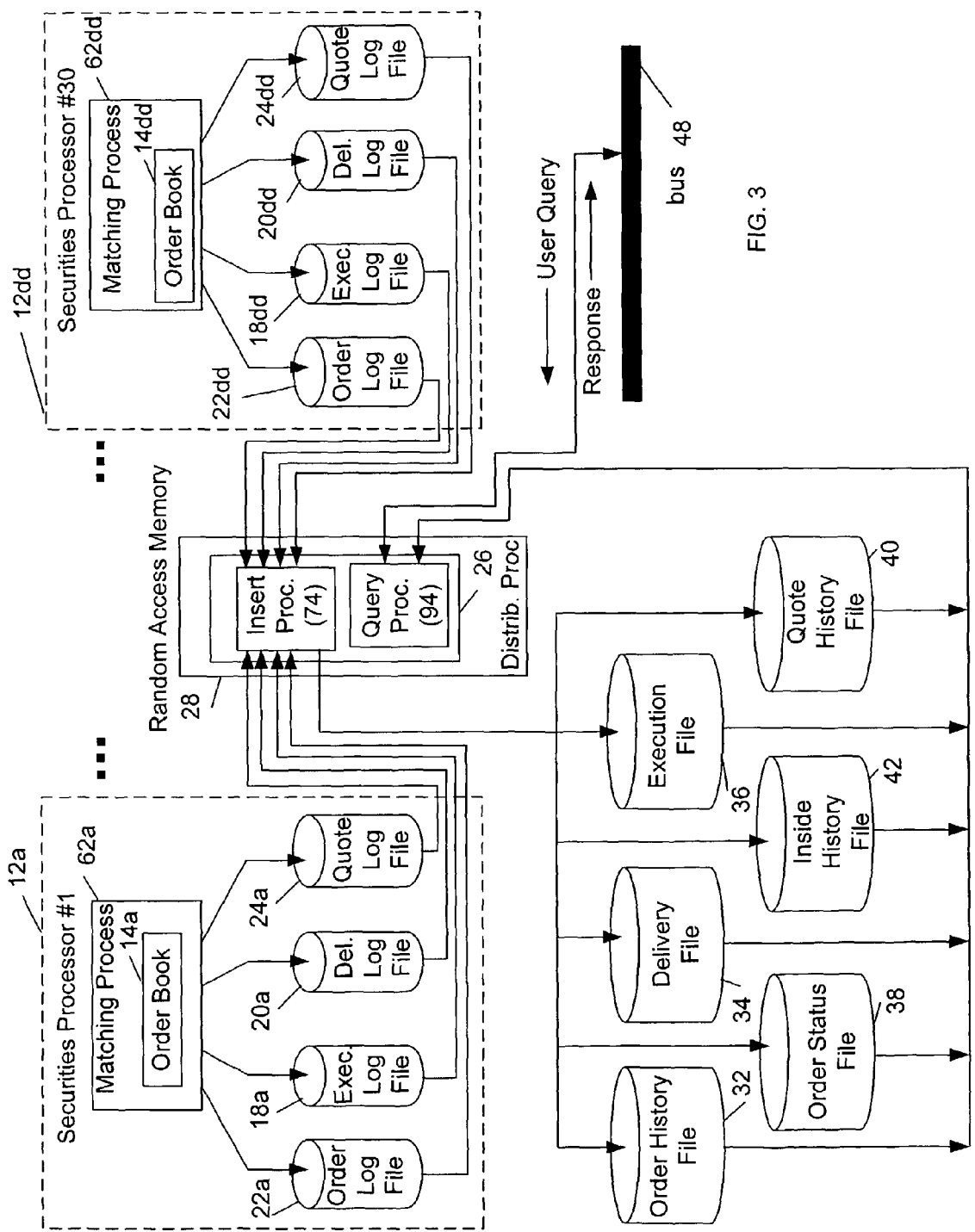
FIG. 3 is a block diagram of securities processors and files.

Referring to FIG. 3, in some implementations thirty securities processors 12a-12dd may be used to balance trading processing and provide data from respective log files 118a-dd, 20a-dd, 22a-dd, 24a-dd for dispensing into the order history file 32, the delivery file 34, the execution log 36, the order status file 38, quote history file 40, and the inside history file 42. The distribution process 26 includes an insert process 74 that retrieves the data from the log files of the respective securities processors 12a-dd and stores the data in the files 32, 34, 36, 38, 40, 42. For example, the order history file 32 receives, from the insert process 74, and stores data representing events related to each order received by the securities processors 12a-dd. The order status file 38 receives the current status of the orders in each order book 14a-dd that reside in each matching process 62a-dd for each of the securities processors 12a-dd. For example, one order may be completely exhausted and have an 'executed' status and another order may be partially executed and retains an 'open' status.

Typically, matching of an incoming order continues so long as the incoming order has a quantity remaining that is executable against orders on the respective order book. Orders such as these have an open status and must be on the market side opposite the incoming order. The execution file 36 receives from the insert process 74 an execution report for each order received and executed by the securities processors 12*a-dd* while the delivery file 34 contains a report for deliveries executed by the securities processors 12*a-dd*. The inside history file 42 and the quote history file 40 respectively contain a history of the inside prices for each security assigned to the securities processors 12*a-dd* and the history of quotes received and stored in the order books 14*a-dd* of each securities processor 12*a-dd* as made by a market maker. In some implementations the inside history file 42 and the quote history file 40 may have access restricted to market regulators, such as MarketWatch™, or other securities regulating entities.

Figure 4:
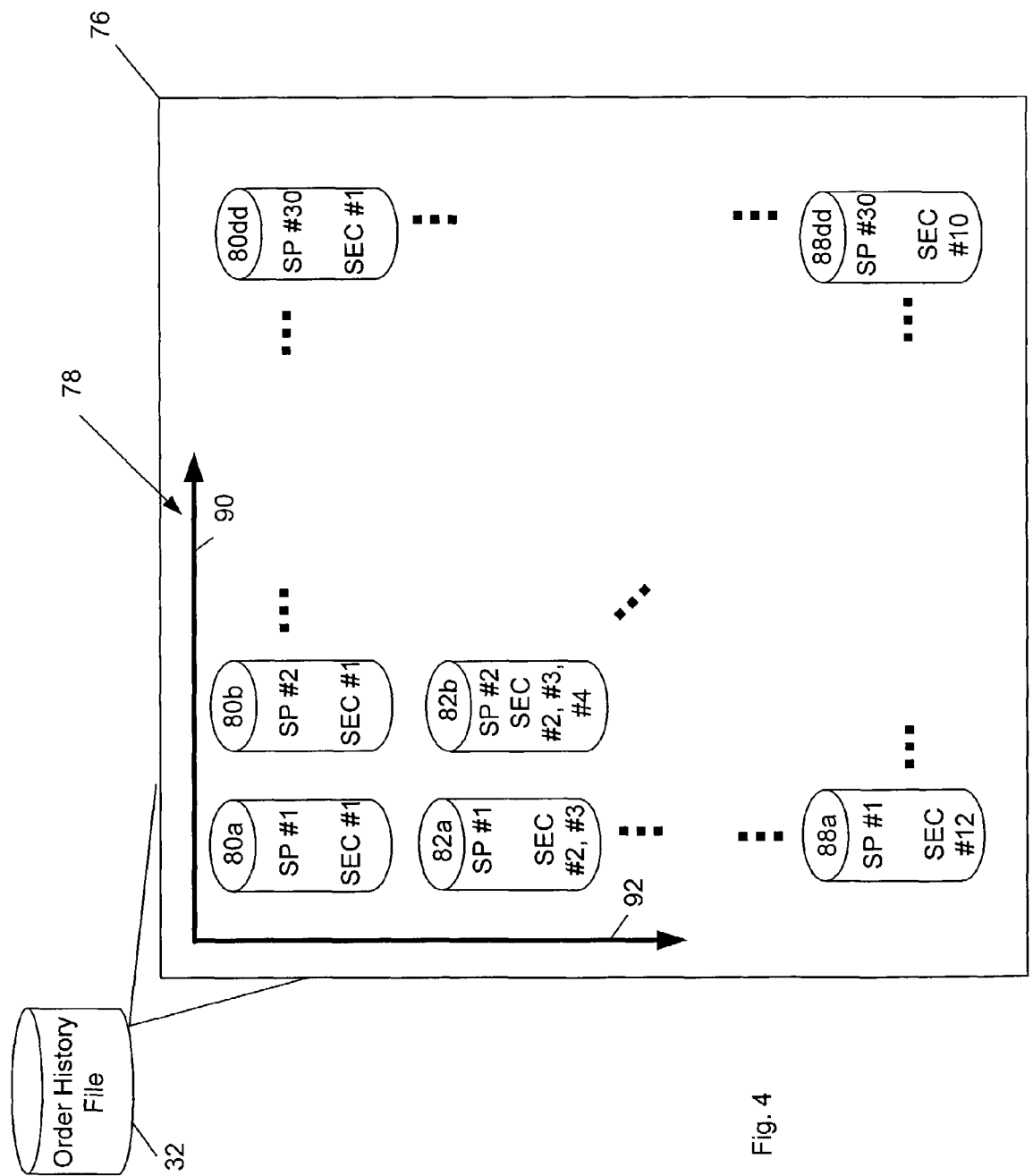
FIG. 4 is a block diagram of an order history file.

Referring to FIG. 4, an example structure 76 for the order history file 32 is shown. The order history file structure 76 partitions the order history file 32 for efficient data accessing, for example, by forming a Cartesian coordinate system 78 of file partitions 80*a*-88*dd*. Each file partition 80*a*-88*dd* is assigned a position along an x-axis 90 and a y-axis 92 of the coordinate system 78 so that file partitions (e.g., 80*a*, 80*b*, . . . , 80*dd*) along the x-axis 90 are separated in accordance to the order histories for each of the thirty securities processors 12*a*-12*dd* (shown in FIG. 3) that are labeled here as "SP #1" through "SP #30". Continuing along the y-axis 92, the file partitions (e.g., 80*a*, 82*a*, . . . , 88*a*) separate order histories in accordance to the trading frequency of the securities assigned to each of the thirty securities processors 12*a-dd*. For example, file partition 80*a* contains the order history of the most heavily traded security (SEC#1) assigned to the first securities processor (SP#1) 12*a*. The next file partition 82*a*, along the y-axis 92, has the order history, for example, of the next two heavily traded securities (SEC#2, #3) assigned to the first securities processor 12*a*. This progression continues along the y-axis 92 to the last file partition 88*a*, for the first securities processor 12*a*, which has the order history for the least-frequently traded security (SEC #12) assigned to the first securities processor 12*a*. Similar partitioning is used along the y-axis 92 for the remaining securities processors 12*b*-12*dd*, however, as shown in file partition 82*b*, the trading frequency of the securities assigned to the file partitions (e.g., SEC #2, #3, #4) may differ from the trading frequency in file partitions for the other securities processors (e.g., file partition 80*a* has order histories for securities #2 and #3). Also, the number of securities assigned to a particular securities processor may also vary, for example, the first securities processor (SP #1) is assigned twelve securities (SEC #1-#12) while the last securities processor (SP #30) is assigned only ten securities (SEC #1-10).

Returning to FIG. 3, along with the order history file 32, the delivery file 34, the execution file 36, the order status file 38, the inside history file 40, and the quote history file 42 may be individually or in combination partitioned to improve data accessing efficiency of the information inserted by the insert process 74 from the respective order log files 22*a-dd*, execution log files 118*a-dd*, delivery log files 20*a-dd*, and quote log files 24*a-dd* of the securities processors 12*b*-12*dd*. By partitioning the files 32, 34, 36, 38, 40, 42, the inserted information from the securities processors 12*a-dd* is distributed and may be quickly accessed from the Cartesian coordinate layout.

The distribution process 26, located in the random access memory 28, also includes a query process 94 for accessing the information stored in the files 32, 34, 36, 38, 40, 42. Typically, a user (e.g., a market participant) interested in a portion of the stored information transmits a query over the bus 48 to the query process 94. After receiving the query, the query process 94 processes the user query and retrieves the information of interest from the files 32, 34, 36, 38, 40, 42. If the information, or a portion of the information, is not present in any of the files 32, 34, 36, 38, 40, 42, a message may be transmitted from the query process 94 to the user that sent the query. If the information is present, it may be retrieved by the query process 94 and transmitted to the user that sent the query, along with other parties with bus 48 access. Since the distribution process manages inserting the information from the securities processors 12*a-dd* to the files 32, 34, 36, 38, 40, 42, the matching process 62 (shown in FIG. 2) is not overloaded by user queries that can slow trading processing.

Typically user queries are predominantly high volume queries that do not have to be supported by the CPU 50 (shown in FIG. 1), thus allowing the CPU to continue to process quotes and orders. For example, a user may send a query for a scan of the order information in the order history file 32. In response to the query, the information may be published onto the bus 48 or a summary of the information, created on a real-time basis or before the time of the query, may be published over the bus. Along with scanning the order history file 32, queries may also be received over the bus 48 to scan the contents of the order status file 34, the execution file 36, or the delivery file 38. Since the inside history file 42 and the quote history file 40 contain sensitive information, permission may be required to access the information in these particular files. Besides scanning a file, an incoming query may also request other information, for example, a market participant may request that the top entry of one or more of the files 32, 34, 36, 38 be read and published over the bus 48.

Also, in some implementations the information in the files 32, 34, 36, 38, 40, 42 may not be maintained overnight and the information is erased from the files at a certain time, usually after the after-hours trading session and before trading on the next trading day. During the daily spin, the history of open order information is published to support individual order queries, so the information is erased prior to the real-time publishing. Also, since modifications to security symbols and corporate actions (e.g., securities split, dividends, mergers, acquisitions, etc.) do not occur during trading hours, security symbol issues, corporate action issues, or other similar issues do not impact the user queries and responses and from the files 32, 34, 36, 38, 40, 42.

Figure 5:
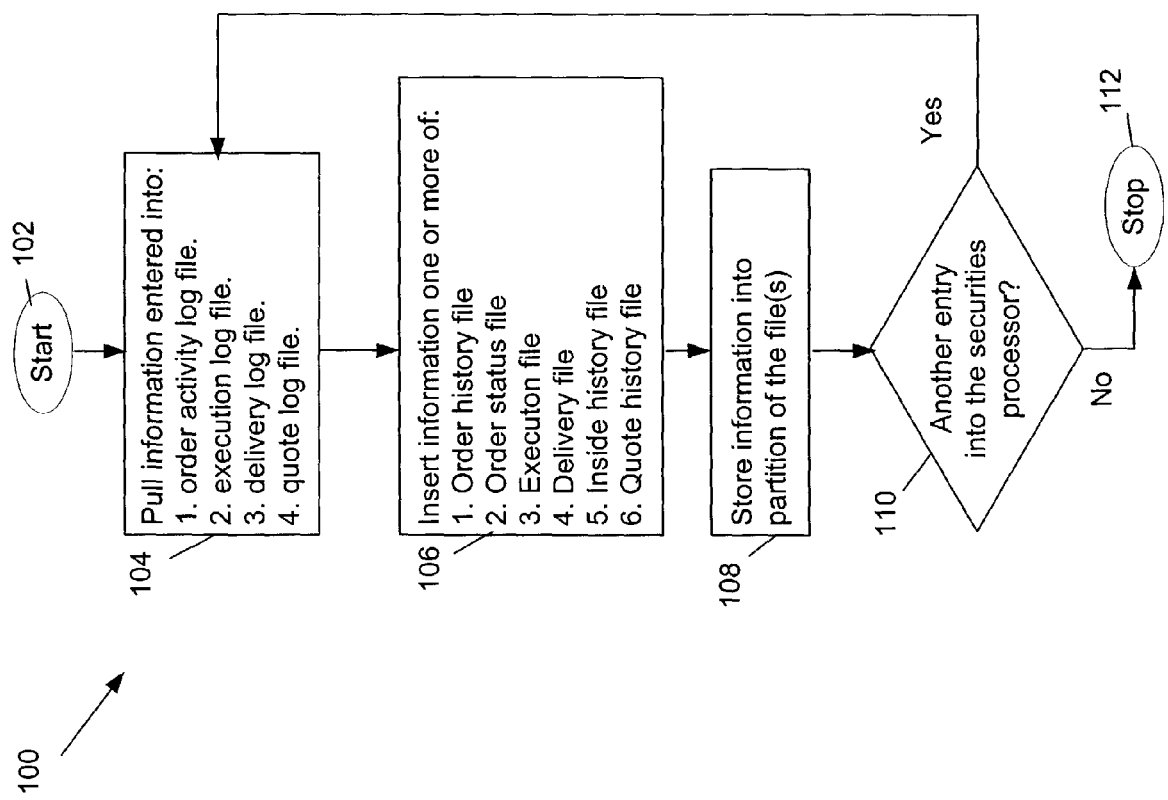
FIG. 5 is a flow chart for storing information from a securities processor.

Referring to FIG. 5, a procedure 100 for storing information entered into a processor that processes securities trades and other transactions, e.g., securities processor is shown. The procedure 100 starts 102 by pulling 104, for example, information entered into one or more of: the order activity log file activity 22, the execution log file 18, the delivery log file 20, or the quote log file 24 (shown in FIG. 1) of the securities processor 12 (also shown in FIG. 1). Once the information is pulled from one or more of the log files, the procedure 100 inserts 106 the information to one or more of: the order history file 32, the delivery file 34, the execution file 36, the order status file 38, the quote history file 40, or the inside history file 42 (also shown in FIG. 1) based upon the type of information. Once inserted 106 into one or more of the files, the procedure 100 stores 108 the information into a partition of the selected file(s). As mentioned, the partitioning may be based on a Cartesian coordinate system that includes, for example, an x-axis for parsing the file partitions as a function of the securities processors and a y-axis for parsing the file partitions as a function of the trading frequency of the security or securities assigned to each securities processor. Once the information is stored 108 in the particular file partition of the selected file(s), the procedure 100 checks 110 for another entry into the log files of each securities processor. If a new entry is detected, the procedure 100 returns to pull 104 the newly entered information and repeats the operations. If no entry into the log files is detected, the procedure 100 stops 112.

Figure 6:
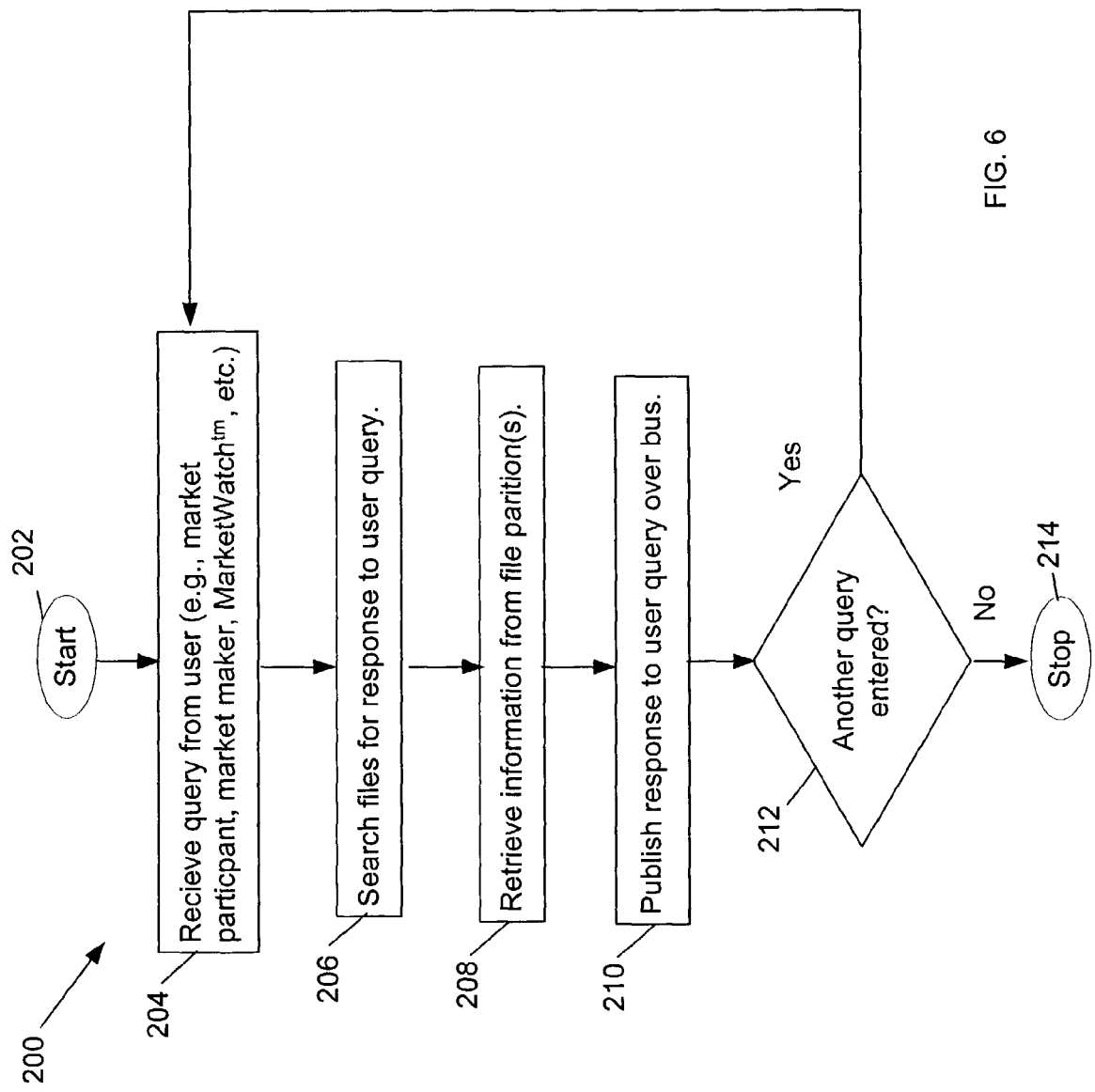
FIG. 6 is a flow chart for processing a user query.

Referring to FIG. 6, a procedure 200 to satisfy status queries and the like is shown. The procedure 200 may execute concurrently with the procedure 100 shown in FIG. 5. The procedure 200 starts 202 by receiving 204 a query from a user (e.g., a market participant, a market maker, MarketWatch™, etc.) of the electronic market and is typically received over the bus 48 (shown in FIG. 1). Once the query is received 204, the procedure 200 searches 206 the one or more of: the order history file 32, the delivery file 34, the execution file 36, the order status file 38, the quote history file 40, or the inside history file 42 (shown in FIG. 1) based upon the user query to deliver information in response to the query. Once the files have been searched 206, the procedure 200 retrieves 208 information from one or more particular file partitions to respond to the user query. After retrieving 208 the information, the procedure 200 publishes 210 a response to the query over the bus 48 (also shown in FIG. 1) to the inquiring user and possibly other parties. After publishing 210 the response over the bus 48, the procedure 200 determines 212 if another query has been entered by a user. If another query has been entered by a user, the procedure 200 returns to receive 204 the query and repeats the processing of the query. If the procedure 200 determines 212 that another query has not been entered, the procedure 200 stops 214. By inserting security information from one or more securities processors into a server storage, the information may be quickly accessed from the common storage location. Further, by transferring the information with a dedicated CPU 44 (shown in FIG. 1), trade processing by the separate CPU 50 (also shown in FIG. 1) is not interrupted by the concurrent transferring of the information. Additionally, the dedicated CPU 44 can receive and process queries from users without taxing the trade processing CPU 50. By balancing the concurrent trade processing and responding to user queries, a user is also better able to conduct securities trading.

The distribution process 26 described herein is not limited to the software embodiment described above; it may find applicability in any computing or processing environment. The distribution process may be implemented in hardware, software, or a combination of the two. For example, the distribution process may be implemented using circuitry, such as one or more of programmable logic (e.g., an ASIC), logic gates, a processor, and a memory.

The distribution process may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the distribution process.

The distribution process may also be implemented as a machine-readable storage medium, configured with a computer program, where, upon execution, instructions in the computer program cause a machine to operate to perform the functions of the distribution process described above.

Embodiments of the order book may be used in a variety of applications. Although the distribution process is not limited in this respect, the distribution process may be implemented with memory devices in microcontrollers, general purpose microprocessors, digital signal processors (DSPs), reduced instruction-set computing (RISC), and complex instruction-set computing (CISC), among other electronic components.

Embodiments of the distribution process may also be implemented using integrated circuit blocks referred to as core memory, cache memory, or other types of memory that store electronic instructions to be executed by a microprocessor or store data that may be used in arithmetic operations.

A number of embodiments of the invention have been described. Nevertheless, it will be understood that various modifications may be made without departing from the spirit and scope of the invention.

What is claimed is:

1. A computer system comprising:
a processor configured to receive electronic trading orders and operatively coupled to;
a main non-transitory memory that holds an order book containing unexecuted trading orders received by the processor, the main non-transitory memory holding the entire order book that stores unexecuted orders for at least one security trading on an electronic trading venue; and
an executable computer program executed on the processor and residing in the main non-transitory memory, with execution of the computer program causing the processor to:
match, by the processor, a received, new, trading order against the unexecuted orders pending in the order book, during matching, the processor accessing the order book for matching wherein other processes are restricted by said processor from accessing the order book;
insert, in a log file that resides in a non-transitory storage medium, information representing an activity relating to a security interest stored in the order book that resides in the main non-transitory memory; and
receive a user query relating to the security interest stored in the log file that resides in the non-transitory storage medium.

2. The computer system of claim 1 wherein the log file contains information representing activities relating to security interests stored in at least two order books that reside in main memory.

3. The computer system of claim 1 wherein the order book is exclusively accessible by the computer program for matching incoming orders and distributing in formation.

4. The computer system of claim 1 wherein the storage medium is a sequential access storage device.

5. The computer system of claim 1 wherein the file is partitioned.

6. The computer system of claim 1 wherein the activity relating to the security interest includes an order.

7. The computer system of claim 1 wherein the query process searches the log file.

8. The computer system of claim 1 wherein the query process retrieves the information from the log file.

9. The computer system of claim 1 wherein the query process responds to the received user query.

10. A computer-implemented method for distributing information in an electronic trading venue comprising:
  matching, by a processor, incoming electronic trading orders against orders pending in an order book that resides in a main non-transitory memory of a computer system, the main non-transitory memory holding the entire order book that stores unexecuted orders for at least one security trading on the electronic trading venue, wherein during matching other processes are restricted by said processor from accessing the order book;
  inserting, by the computer system that includes the main non-transitory memory, a record into a log file that resides in a sequential non-transitory access storage medium, the record having information representing an activity relating to a security interest stored in the order book that resides in main memory; and
  receiving, by the computer system, a user query relating to the security interest stored in the file that resides in the non-transitory access storage medium.

11. The method of claim 10 wherein the log file contains information representing activities relating to security interests stored in at least two order books each order book for a different one or more securities that reside in main memory.

12. The method of claim 10 wherein the order book is exclusively accessible by a computer program for matching incoming orders and distributing information.

13. The method of claim 10, further comprising:
  directing, by the processor, queries for status of the order book information to the sequential access storage device.

14. The method of claim 10 wherein the log file is partitioned with file partitions separated in accordance with order histories and trading frequency of securities.

15. The method of claim 10 wherein the activity relating to the security interest includes an order.

16. The method of claim 10 further comprising searching the log file.

17. The method of claim 10 further comprising retrieving the information from the log file.

18. The method of claim 10 further comprising:
  responding, by the processor, to the received user query by retrieving information pertaining to the order book from the log file stored in the non-transitory storage medium.

19. A computer program product comprising computer executable instructions residing on a non-transitory computer readable medium for causing a computer to:
  match, by the computer, incoming electronic trading orders against orders pending in an order book that resides in a main non-transitory memory of a computer system, the main non-transitory memory holding the entire order book that stores unexecuted orders for at least one security trading on an electronic trading venue, wherein during matching other processes are restricted by said processor from accessing the order book;
  insert a record in a log file that resides in a non-transitory storage medium the record having information representing an activity relating to a security interest stored in the order book that resides in main memory; and
  receive a user query relating to the security interest stored in the log file that resides in the storage medium.

20. The computer program product of claim 19 wherein the log file contains information representing activities relating to security interests stored in at least two order books that reside in main memory.

21. The computer program product of claim 19 wherein the order book is exclusively accessible by a computer program for matching incoming orders and distributing information.

22. The computer program product of claim 19 wherein the storage medium is a sequential access storage device.

23. The computer program product of claim 19 wherein the log file is partitioned.

24. The computer program product of claim 19 wherein the activity relating to the security interest includes an order.

25. The computer program product of claim 19 further comprising instructions to cause the computer to:
  search the log file.

26. The computer program product of claim 19 further comprising instructions to cause the computer to:
  retrieve the information from the log file.

27. The computer program product of claim 19 further comprising instructions to cause the computer to:
  respond to the received user query.

* * * * *